US 6,629,148 B1

(12) United States Patent
Ahmed et al.

(10) Patent No.: US 6,629,148 B1
(45) Date of Patent: Sep. 30, 2003

(54) DEVICE AND METHOD FOR BALANCING LOADS BETWEEN DIFFERENT PATHS IN A COMPUTER SYSTEM

(75) Inventors: Khalid Ahmed, Markham (CA); Rodney William Jones, Mississauga (CA); Ming Q. Xu, Toronto (CA)

(73) Assignee: Platform Computing Corporation, Markham (CA)

(*) Notice: Subject to any disclaimer, the term of this patent is extended or adjusted under 35 U.S.C. 154(b) by 0 days.

(21) Appl. No.: 09/385,641

(22) Filed: Aug. 27, 1999

(51) Int. Cl.[7] .............................................. G11B 15/173
(52) U.S. Cl. ...................................... 709/238; 709/239
(58) Field of Search ................................ 709/238, 239, 709/241, 243, 240

(56) References Cited

U.S. PATENT DOCUMENTS

| | | | | |
|---|---|---|---|---|
| 5,444,848 A | * | 8/1995 | Johnson, Jr. et al. | ... 395/200.15 |
| 6,078,946 A | * | 6/2000 | Johnson | ........................ 709/200 |
| 6,137,782 A | * | 10/2000 | Sharon et al. | .............. 370/255 |
| 6,192,402 B1 | * | 2/2001 | Iwase | ......................... 709/223 |
| 6,205,122 B1 | * | 3/2001 | Sharon et al. | .............. 370/254 |
| 6,345,041 B1 | * | 2/2002 | Kimball et al. | .............. 370/235 |
| 6,351,775 B1 | * | 2/2002 | Yu | .............................. 709/238 |
| 6,421,714 B1 | * | 7/2002 | Rai et al. | ..................... 709/217 |

* cited by examiner

Primary Examiner—Glenton B. Burgess
Assistant Examiner—Tod Kupstas (57) ABSTRACT

A system and method for balancing loads in a computer system is disclosed. The system and method assess the health of various paths in a computer system by determining the health or status of at least two layers on each path. A health or status of the paths is then determined based on the information of the health of each layer in the path. A load balancing device routes information for processing to the various paths based on the determined health of the paths. To better estimate the health of a path, algorithms which weight the health signals for each layer are used giving greater weight to layers of greater importance. The system and method can also add or remove additional paths if the combined health of the existing paths is determined to be above or below a predetermined value. In addition, the weight of certain layers can be locked in to provide for updating of specific layers. A topology of the computer system is used to determine the health or status of the paths and this topology can either be entered by a programmer or independently determined by the load balancing system.

21 Claims, 3 Drawing Sheets

DEVICE AND METHOD FOR BALANCING LOADS BETWEEN DIFFERENT PATHS IN A COMPUTER SYSTEM

FIELD OF THE INVENTION

This invention relates to computer systems for processing information received through a network. More particularly, this invention relates to a load balancing device and method to more efficiently process information received by a computer system over a network.

BACKGROUND OF THE INVENTION

It is known in the art to use load balancing devices to route information between various paths in a computer system. Such load balancing devices have been used in the past to switch or distribute the load or processing of the information being received to different paths. This increases the efficiency of the computer system by more efficiently using the resources of the computer system.

Many prior art load balancing devices route the information to the different paths in a predetermined order. This permits the load to be distributed amongst the various paths, thereby increasing the efficiency of the system.

Furthermore, some prior art load balancing devices route information based on the status of the first layer in the path. For example, some prior art load balancing devices determine whether or not the first layer of a path has malfunctioned and route information away from the path having a malfunctioning first layer. Load balancing devices in the past have also been used to determine whether or not the first layer in a path is busy processing previous information such that it is not presently available to process additional information.

However, the load balancing devices of the prior art suffer from the disadvantage that they are not aware of the status of other servers or devices located along the path but behind the first layer. In other words, load balancing devices of the prior art are limited to routing information based on the status of the first layer in the path, rather than the status or health of other layers in the path. For example, the prior art load balancing devices can determine if a malfunction has occurred with respect to the first layer in the path, but cannot access or determine whether any of the layers behind the first layer have malfunctioned or are busy. One reason prior art devices are limited in this way is that the prior art load balancing devices are generally only connected to the first layer of the path, and therefore can only receive information regarding the status or health of the first layer of the paths, but cannot receive information regarding the other layers of the paths.

The prior art load balancing devices are also limited in that they route information based solely on the status or health of the hardware of the first layer in a path. In other words, the prior art load balancing devices do not determine the status or health of the application being run on the hardware of the first layer in the path, let alone the status of the applications being run on the other layers of the paths.

Accordingly, there is a need in the art for computer systems which can route information to various paths based on the status or health of more than the first layer, and preferably all of the layers, in each of the paths. In addition, there is a need in the art for computer systems which can assess the status or health of all aspects of each of the layers, including the hardware and the applications being run on the hardware, such that a more accurate estimate of the load being placed on each path, and the health of a path, can be made to more efficiently route information to the paths.

SUMMARY OF THE INVENTION

Accordingly, it is an object of this invention to at least partially overcome the disadvantages of the prior art. Also, it is an object of this invention to provide an improved device and method for balancing loads between different paths in a computer system based on the status or health of more than just the first layer of the paths.

Accordingly, in one aspect, the present invention provides in a computer system for receiving information from a network, said computer system operable to process said information through at least two paths with at least two layers in one of the paths, a load balancing system for balancing processing of the information on each of the paths of the computer system, said load balancing system comprising: a load balancing device for routing said information to each of the at least two paths; health assessing agents for assessing the health of at least two layers on each path and generating layer health signals indicative of the health of each assessed layer; application information manager for receiving the layer health signals, determining the health of each path based on the health signals, and generating path health signals indicative of the health of each path; and wherein the load balancing device receives the health path signals and routes the information to the path based on the health of the paths.

In another aspect, the present invention provides in a computer system for receiving information from a network, said computer system operable to process said information through at least two paths with at least two layers on one of the paths, a load balancing method for balancing processing of the information on each of the paths of the computer system, said load balancing method comprising the steps of: assessing the health of at least two layers on each path; generating layer health signals indicative of the health of each assessed layer; determining the health of each path based on the layer health signals; generating path health signals indicative of the health of each path; and routing the information to the paths based on the health of the paths.

Accordingly, one advantage of the present invention is that the health of more than just the first layer of the paths, and preferably the health of each layer of each path, is determined such that an accurate representation of the health of each path can then be determined. In this way, information can be routed by the load balancing device based on the health of each of the paths, rather than just the first layer of each of the paths. Clearly, this provides more efficient utilization of the resources of each of the paths, and therefore more efficient processing of the information.

A further advantage of the present invention is that the health of both the hardware component and the application component of each layer can be determined by the health assessing agents. In this way, a more accurate representation of the health of the layer can be determined because the health of both components of the layer, namely the hardware and the application being run on the hardware, are being considered. This also increases the efficiency of the load balancing system and method by more efficiently utilizing the resources of the paths, which resources include both the hardware and the applications being run on the hardware.

A still further advantage of the present invention is that the health of the paths can be determined based on a predetermined algorithm. In this way, the information derived from the layer health signals can be used so as to present a better indication of the health of the path. For example, the algorithm can be a weighted sum of the different layers, giving weights to each health of the layers corresponding to their relative importance. In this way, if a particular layer in a path is more crucial or will require additional processing time to process information, this can be taken into account when determining the health of the path. In addition, the algorithm can include conditions whereby the entire path is shown as malfunctioning when a single component in the path has malfunctioned. This occurs when the entire path cannot operate because one of the layers in the path has malfunctioned. In the alternative, the algorithm can determine if a portion of the path can still be utilized even if one or more of the layers in the path have malfunctioned.

Furthermore, the algorithm can be used to produce a binary path health signal where a path is healthy if the health of the path is above a first threshold value and unhealthy if below a second threshold value. In this way, the value of the path health signal being sent to the load balancing device will not change as often, but only when a threshold value is exceeded.

A further advantage of the present invention is that the load balancing system can be used to add or remove additional paths to which the information can be routed. In this way, the load balancing system can release underutilized resources for other uses, which increases the overall efficiency of the computer system.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
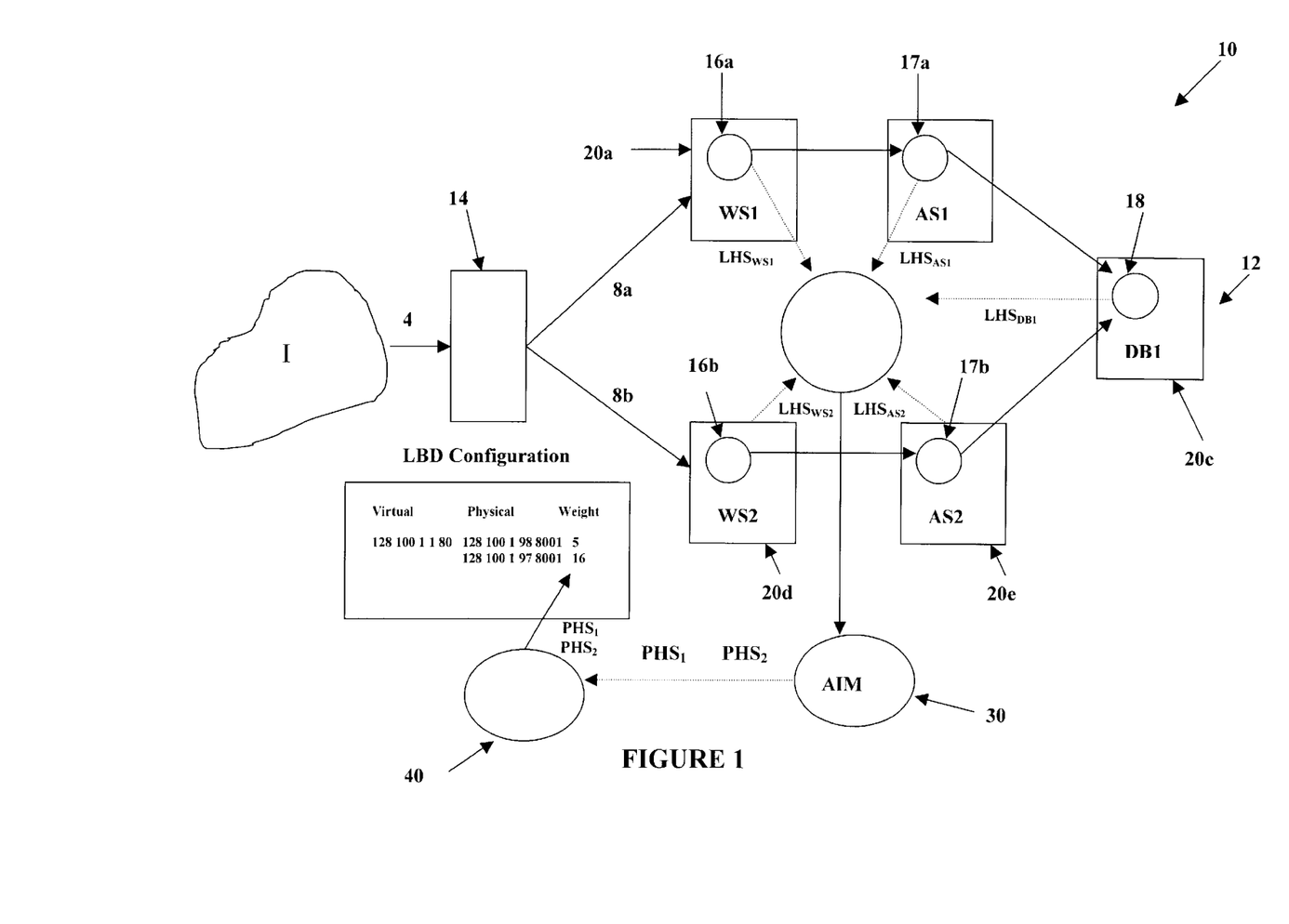
FIG. 1 is a schematic diagram of a computer system with a load balancing system according to one embodiment of the present invention.

FIG. 1 shows a computer system, shown generally by reference numeral 10, comprising a load balancing system, shown generally by reference numeral 12. As shown in FIG. 1, the computer system 10 comprises two paths 8a, 8b for processing information received over a network I.

The network I may represent the Internet or other networks through which the computer system 10 receives information. The information received by the computer system 10 from the network I can include any type of information, such as instructions, requests or data. It is understood that the computer system 10 can process the information and return a response to the network I.

Information received over the network I is directed generally to a virtual server 4 which will have a corresponding address. In the embodiment shown in FIG. 1, the address of the virtual server 4 is 128.100.1.1, Port 80. Information received through the Internet is directed to the load balancing device 14 which then directs the information to the paths 8a, 8b representing in this embodiment physical servers. The physical servers in this embodiment have the physical addresses 128.100.1.99, Port 8001 and 128.100.1.97, Port 8001.

Each of the paths 8a, 8b have layers 20. The layers 20 of the paths 8a, 8b correspond to different objects which can perform different functions in order to process the information received over the network I. For example, the first path 8a of the computer system 10 illustrated in FIG. 1 has a first layer 20a which is a web server WS1 for receiving the information from the network I. The first path 8a has a second layer 20b which is an application server AS1. The application server AS1 will execute a program or otherwise manipulate the information and may or may not return a response to the web server WS1 to be sent back to the network I. The third layer 20c of the first path 8a comprises a database DB1. The database DB1 contains data which the application server AS1 may access, change, delete or add to.

Likewise, the second path 8b has a first layer 20d which is a second web server WS2, performing a similar function to the first web server WS1. Likewise, the second path 8b has a second layer 20e which comprises a second application server AS2. The second application server AS2 will also execute an application to manipulate the information received from the network I. The second application server AS2 may perform a similar or different application to that being executed by the first application server AS1. The second path 8b also comprises the first database DB1 to which the second application server AS2 can access, change, remove or add data to, similar to the first application server AS1.

It is noted that the first database DB1 forms the third layer 20c of both the first path 8a and the second path 8b, but this may not necessarily be the case. Rather, the present invention can be equally applicable to computer systems having different topologies and configurations from the computer system 10. In particular, the present invention can be utilized with topologies where each path 8a, 8b has a corresponding database.

Routing of the information received from the network I to the paths 8a, 8b is controlled by the load balancing system 12. The load balancing system 12 comprises a load balancing device 14 which routes the information to each of the paths of the computer system 10 based on signals received from the other components of the load balancing system 12. As the embodiment shown in FIG. 1 has two paths 8a, 8b, the load balancing device 14 will route the information to one of these two paths, 8a, 8b. It is understood that the load balancing device 14 is expandable to be able to route the information to more than two paths 8a, 8b.

The load balancing system 12 further comprises health assessing agents 16, 17 and 18. The health assessing agents assess the health or status of at least two layers 20 on each path 8a, 8b. Preferably each layer 20 on each path 8a, 8b will have a corresponding health assessing agent 16, 17, 18 to assess the health of each layer. For example, on the first path 8a in FIG. 1, a web server health assessing agent 16a is shown for assessing the health of the first web server WS1, an application health assessing agent 17a is shown for assessing the health of the first application server AS1 and a database health assessing agent 18 is shown for assessing the health of the first database DB1. Likewise, on the second path 8b illustrated in FIG. 1, there is a web server health assessing agent 16b for assessing the health of the second web server WS2 and an application health assessing agent 17b for assessing the health of the second application server AS2.

The health assessing agents 16, 17 and 18 can assess the health of each of the layers 20 based on conditions which are pre-programmed into each of the health assessing agents 16, 17 and 18. For example, the health assessing agents 16, 17 and 18 may assess the health or status of the corresponding layer 20 based on an agent framework library which produces a numerical value corresponding to the conditions of the corresponding objects WS1, WS2, AS1, AS2, DB1. The agent framework library may be determined by the designer of the computer system 10 and can be updated from time to time.

The agent framework library may have a multitude of conditions and corresponding numerical values representing the health of layer 20 for each of the conditions. Furthermore, it is apparent that the conditions in the agent framework library will depend on the corresponding objects WS1, WS2, AS1, AS2, DB1 present on the layer 20.

For example, in the case of the web servers WS1, WS2, the conditions which may be pre-programmed into the agent framework library of health assessing agents 16a, 16b to assess the health of each web server WS1, WS2 may include the number of connections to each web server WS1, WS2, the response time to a request, whether a link is dead and whether or not an error has been received by the web server WS1, WS2 from the corresponding application server AS1, AS2. For the application servers AS1, AS2, the conditions which may be pre-programmed into the agent framework library of the health assessing agents 17a, 17b to assess the health of the application servers AS1, AS2 may include the number of connections to each of the application servers AS1, AS2, the number of threads, the number of database connections and any errors produced by the application being executed by the application servers AS1, AS2. Likewise, for the database DB1, the conditions which may be pre-programmed into the agent framework library of the database health assessing agent 18 to assess the health of the database DB1 may include the number of connections to the database DB1, the number of concurrent threads, the number of shared memory segments and the size of the memory.

It is apparent from the conditions that may be pre-programmed into the agent framework library of the health assessing agents 16, 17, 18 that the health of the layers 20 will be assessed based on both the health or status of the hardware, as well as the software or application being executed on the layer 20. In this way, the health assessing agents 16, 17, 18 provide a better indication of the status or health of the layers 20, and therefore the ability of the layers 20 to process additional information from the network I.

Each health assessing agent 16, 17 and 18 can also generate a layer health signal LHS indicative of the health of each layer 20 as assessed by the health assessing agents 16, 17 and 18. These layer health signals LHS, illustrated in FIG. 1 by symbols $LHS_{WS1}$, $LHS_{WS2}$, $LHS_{AS1}$, $LHS_{AS2}$, $LHS_{DB1}$, are generated by the health assessing agents 16a, 16b, 17a, 17b, 18, respectively, and are indicative of the health of the corresponding layer 20.

The layer health signals LHS are sent to and received by an application information manager 30. The layer health signals LHS can either be continuously sent to the application information manager 30, sent periodically or sent in response to a request from the application information manager 30. The application information manager 30 receives the health signals LHS and then determines the health of each of the paths 8a, 8b. The application information manager 30 may determine the health of the paths 8a, 8b based on a topology of the computer system 10, and, an algorithm. Once the application information manager 30 determines the health of each path 8a, 8b, the application information manager 30 generates path health signals $PHS_1$ and $PHS_2$, representing the health of the first path 8a and the second path 8b, respectively.

The path health signals $PHS_1$ and $PHS_2$ are then received by load balancing device 14. Preferably, the load balancing device 14 comprises a load balancing agent 40 which transforms the path health signals $PHS_1$ and $PHS_2$ to a form which can be understood by the load balancing device 14 and thereby alter the load balancing device 14 ("LBD") configuration. The load balancing device 14 receives the path health signals $PSH_1$, $PHS_2$ through the load balancing agent 40 and then routes the information from the network I to the paths 8a, 8b based on the health of the paths 8a, 8b as indicated by.the path health signals $PHS_1$ and $PHS_2$. For example, the load balancing device 14 may route the information to the paths 8a and 8b in a proportion corresponding to the health of the paths 8a, 8b, such that if the value of the path health signal $PHS_1$ for the first path 8a is twice as large as the value of the path health signal $PHS_2$ for the second path 8b, the load balancing device 14 may direct twice as much information or requests to the path 8a as the second path 8b. The load balancing device 14, of course, could also route the information to the paths 8a, 8b in other proportions or in other ways based on the health of the paths as represented by the path health signals $PHS_1$ and $PHS_2$.

As indicated above, the application information manager 30 comprises a topology upon which the health of the paths 8a, 8b will be determined. For example, the application information manager 30 will receive the layer health signals LHS for the first path 8a, namely the signals $LHS_{WS1}$, $LHS_{AS1}$ and $LHS_{DB1}$, which are the layer health signals LHS for each of the layers 20a, 20b, 20c in the first path 8a, and use these layer health signals LHS to generate the path health signal $PHS_1$. Likewise, the application information manager 30 will receive the layer health signals LHS for the second path 8b, namely the signals $LHS_{WS1}$, $LHS_{AS2}$ and $LHS_{DB1}$, which are the layer health signals for each of the layers 20d, 20e, 20c in the second path 8b, and use these layer health signals LHS to generate the path health signal $PHS_2$.

The topology of the computer system 10 can be programmed into the application information manager 30 by the system programmer when the computer system 10 is first configured. Of course, each time a change is made to the computer system 10, the system programmer must then change the topology configured into the application information manager 30. In a preferred embodiment, the application information manager 30 can independently determine the topology of the computer system 10. For example, the application information manager may receive the layer health signals LHS from each of the health assessing agents 16, 17 and 18 and from these determine the type of server sending the layer health signal LHS, and the arrangement of the objects WS1, AS1, DB1, WS2, AS2 within the paths 8a, 8b, thereby determining the topology of the computer system 10.

The layer health signals LHS will be combined to generate the path health signals $PHS_1$ and $PHS_2$ according to the algorithm as referred to above. The algorithm can be any type of algorithm which is predetermined and stored in the application information manger 30. For example, in one simple embodiment, the algorithm may comprise a weighted sum of each of the layer health signals LHS of the layers 20 in the paths 8a, 8b. The weighted sum will weight the value of each of the layer health signals LHS providing more weight to the layer health signals $LHS_{WS1}$, $LHS_{WS2}$, $LHS_{DB1}$ of the first path 8a, which are of greater importance or which affect the health of the path 8a the most. For example, if the health of the application server AS1 affects the health of the first path 8a twice as much as the health of the web server WS1, the value of the layer health signal $LHS_{AS1}$ from the health assessing agent 17a assessing the health of the first application server AS1 will be weighted twice as much as the value of the layer health signal $LHS_{WS1}$ from the health assessing agent 16a assessing the health of the first web server WS1. Likewise, the health of the second path 8b can be generated in a similar manner based on the values of the layer health signals $LHS_{WS2}$, $LHS_{AS2}$ and $LHS_{DB1}$ from the health assessing agents 16b, 17b and 18 and representing the assessed health of the second web server WS2, the second application server AS2 and the database DB1, respectively.

The layer health signals LHS can of course have any form to permit the layer health signals LHS to indicate to the application information manager 30 the health of the corresponding layer 20. Preferably, the layer health signals LHS be in the form of a non-binary value between 0 and 1, but other arrangements can occur.

Likewise, the path health signals PHS can have any form to indicate the health of the corresponding paths 8a, 8b to the load balancing agent 40 of the load balancing device 14. For example, the path health signals PHS can have a value of between 0 and LHS max where 0 indicates that the path 8a, 8b is not functional and is "unhealthy" and LHS max indicates that the path 8a, 8b is operating at the maximum level of efficiency.

Often, however, it is not necessary to know the health of the path to a great deal of precision. In other words, in some cases, a binary health path signal, where 0 indicates the path 8a, 8b is unhealthy such that information should not be routed and 1 indicates the path 8a, 8b is healthy such that information can be routed, may be used. In such cases, the path health signals PHS will have a 0 or 1 value depending on whether or not the path health as determined by the application information manager 30 is above or below a threshold. For example, the value of the path health signal PHS will be generated based on the following:

PHS=1 if path health>threshold

PHS=0 is path health<threshold

A variation on this algorithm would be that the upper and lower threshold values are not the same but rather different. In other words, the value of the path health signal would be set to 0 if the health of the path 8a, 8b was assessed to be less than a minimum threshold Tmin, and the path health signal PHS would not return to 1 unless the health of the path exceeded a maximum threshold Tmax. In other words, the application information manager 30 would generate the path health signals based-on the following:

PHS=1 if path health>Tmax

PHS=0 if path health<Tmin where Tmax>Tmin

By using the above algorithm to generate the path health signals PHS fewer changes in the value of the path health signals PHS, and therefore the routing of the load balancing device 14, will occur. In this way, the load balancing device 14 will operate more efficiently. Also, by using the threshold values, especially where the threshold values Tmin and Tmax differ, a path which has a path health signal PHS of 0 indicating that it is unhealthy, will have an opportunity to "cool down" before additional requests are sent to the path 8a, 8b.

In a similar manner, a further algorithm which can be used to generate the path health signal PHS can incorporate a set "cool down" period of time. In this way, if the health of a particular path as determined by the application information manager 30 is indicated to be below a threshold value, the path health signal PHS will not return to a value indicating the path 8a, 8b is healthy for a predetermined period of time. This algorithm can be represented by the following equation:

If path health<threshold then set PHS of path to 0 for $n$ seconds and reset to 1

It is understood that while both of the algorithms discussed above involving threshold values and a set "cool down" period where the path health signal PHS remains at 0 for a period of time, have been described in terms of binary path health signals PHS, the algorithms are not limited to these embodiments. In other words, rather than setting the path health signals PHS to a value of 1, both these algorithms can be used to return the path health signals PHS to a non-zero value between 0 and a maximum path health signal PHSmax.

A still further algorithm which may be used to generate the path health signals involves an analysis not only of the health of a single path 8a, 8b, but of the health of all of the paths 8a, 8b. In this case, the algorithm would look at the absolute values of the health of each path, 8a, 8b and attempt to minimize the difference in the health of each path so as to equally load each of the paths 8a, 8b. Such an algorithm can be implemented as follows:

best path health maximum path health among all paths worst path health minimum path health among all paths if (best path health−worst path health>threshold) then set PHS for worst path to 0 else et PHS of all paths to equal non-zero values

It is clear that in addition to information being routed to the paths 8a, 8b, other components of the computer system 10 may wish to access one or more of the objects WS1, WS2, AS1, AS2, DB1. For example, a policy may need a particular path 8a, 8b to be taken off line in order to process the policy. For example, a web content management policy may require that a particular web server WS1, WS2 be taken off line while its content is refreshed. In order to avoid conflicting layer health signals LHS which may not correctly reflect the health of the layer 20, a preferred embodiment of the present invention permits the health of a layer 20 or path 8a, 8b to be locked. In this way, policies may be processed by issuing a lock signal to the application information manager 30 which is then sent to the load balancing agent 40 to lock the value of a layer health signal LHS or path health signal PHS to 0, or another value, to permit processing of the policy. Once processing of the policy has been completed, an unlocked signal is sent indicating that the value of the layer health signal LHS and path health signal PHS can then be changed. In this way, conflicting values of the layer health signal LHS and path signal PHS can be avoided.

Clearly, if an object WS1, WS2, AS1, AS2, DB1 on one of the paths 8a, 8b has failed, the layer health signal LHS for that layer 20 will be set to 0, or another value, indicating that the layer 20 is not healthy. The application information manager 30 may then set the corresponding path health signal PHS for the path 8a, 8b to 0 indicating that the path 8a, 8b is not healthy and no information should be routed to it. If, however, the application information manager 30 determines that the path 8a, 8b can still partially function even though the layer health signal LHS for one of the layers is 0, the application information manager 30 will send a path health signal PHS indicating to the load balancing device 14 that limited information or requests can be sent to the path 8a, 8b.

In a preferred embodiment, if a layer health signal LHS has not been received from a particular layer 20, the application information manager 30 may assume that a layer health signal LHS has not been received by a particular layer 20 because the health assessing agent 16, 17, 18 has failed. In this case, the application information manager 30 will lock the values for that particular path 8a, 8b relying on the last received layer health signal LHS and indicate to the system programmer that a failure in one of the health assessing agents 16, 17 or 18 has occurred.

Figure 2:
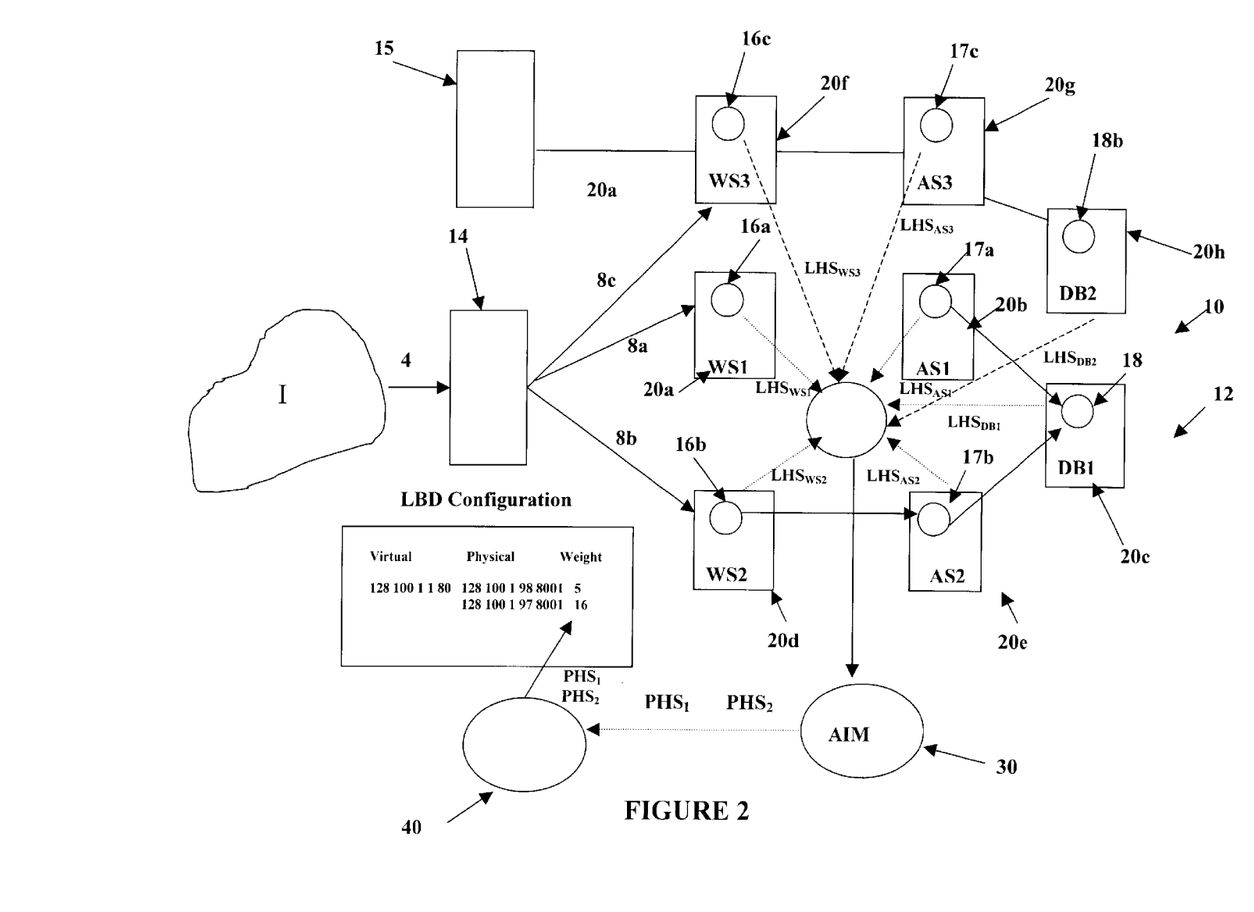
FIG. 2 is a schematic diagram of a computer system with a load balancing system according to a further embodiment of the present invention.

FIG. 2 shows a further preferred embodiment of the present invention. As shown in FIG. 2, a third path 8c is present. The third path 8c comprises a first layer 20f having a third web server WS3, a second layer 20g having a third application server AS3 and a third layer 20h having a second database DB2. Similar to first and second paths 8a, 8b, health assessing agent 16c assesses the health of the third web server WS3 and generates a layer health signal $LHS_{WS3}$, health assessing agent 17c assesses the health of the third application server AS3 and generates layer health signal $LHS_{AS3}$, and, health assessing agent 18b assesses the health of the second database DB2 and generates layer health signal $LHS_{DB2}$.

The third layer 8c, while connectable to the load balancing device 14, will also be connectable to other load balancing devices, such as load balancing device 15. In general, the path 8c will receive information routed from the second load balancing device 15. However, in instances where the path health signals PHS for paths 8a, 8b are collectively below a predetermined value CPHSmin, the load balancing device 14 can add the third path 8c to assist in processing the additional load. Once the path health signals PHS collectively of the three paths 8a, 8b, 8c are above a second predetermined value CPHSmax, the load balancing device 14 can then remove path 8c and discontinue routing information to path 8c. Path 8c can then be used to receive information routed from the second load balancing device 15. In this way, the load balancing devices 14, 15 can dynamically add and relinquish paths 8a, 8b, 8c to more efficiently use the resources of the computer system 10.

Figure 3:
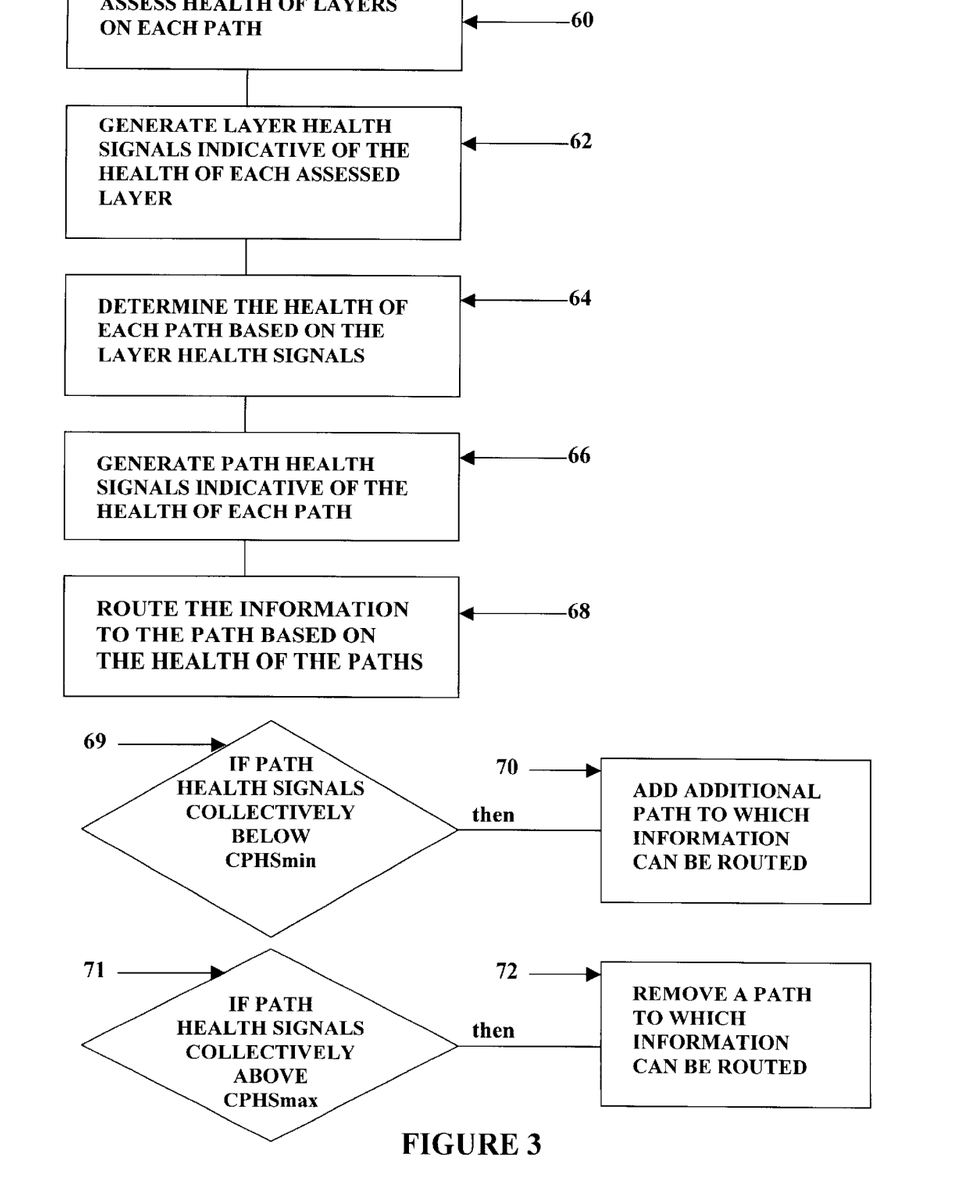
FIG. 3 is a flowchart illustrating operation of the load balancing system according to one embodiment of the invention.

FIG. 3 shows a flow chart illustrating operation of a load balancing method according to one embodiment of the invention. As shown in FIG. 3, the first step 60 of the load balancing method comprises assessing the health of the layers 20. As indicated above, preferably, at least the health of two layers 20 on each path 8a, 8b is assessed and more preferably the health of each layer 20 on each path 8a, 8b is assessed. In the next step 62, layer health signals LHS indicative of the health of each assessed layer 20 are generated. Once the layer health signals LHS are generated, they are sent to the application information manager 30 which then determines the health of each path 8 based on the received layer health signals LHS at step 64. At step 66, path health signals PHS indicative of the health of each path 8a, 8b are then generated and sent to the load balancing device 14, preferably through a load balancing agent 40. The load balancing agent 14 then routes the information to the paths 8a, 8b based on the health of the paths as indicated by the path health signals PHS as shown in step 68.

In a preferred embodiment, the method comprises step 70 which permits an additional path of the computer system to be added such that information from the load balancing device 14 can be routed to the addition path. The additional path will be added if the condition in step 69 is satisfied, namely if the path health signals PHS are collectively below a predetermined value CPHSmin. Likewise, the load balancing method comprises a step 72 whereby a path 8 to which information is routed can be removed if the condition in step 71 is satisfied, namely if the path health signals PHS are collectively above a predetermined value CPHmax.

The method in FIG. 3 may be continuously performed, or, it may be performed only when a change occurs in one of the layer health signals LHS.

It is understood that the application information manager 30 can be located anywhere in the computer system 10 and need not necessarily be located separately from the other objects WS1, AS1, DB1, WS2, AS2 in the computer system 10. For example, the application information manager 30, rather than being shown separately, may be hosted in one of the objects, such as the second application server AS2. However, if the application information manager 30 is hosted in one of the objects WS1, AS1, DB1, WS2, AS2, the application information manager 30 must be capable of automatically migrating to different objects WS1, AS1, DB1, WS2, AS2, in the event that the object WS1, AS1, DB1, WS2, AS2 upon which the application information manager 30 is hosted malfunctions or becomes inoperable. Otherwise, the application information manager 30, as well as the entire load balancing system 12, may fail should the objects WS1, AS1, Del, WS2, AS2, which hosts the application information manager 30, fail. Likewise, the health assessing agents 16, 17, 18 may be hosted on the same computers as the objects WS1, WS2, AS1, AS2, DB1, or located remotely therefrom.

It is understood that although the preferred embodiment has been described in terms of a computer system 10 comprising web servers WS1, WS2, application servers AS1, AS2 and a database DB1, the present invention is not limited to a computer system 10 comprising these specific components. In particular, the present invention is not necessarily limited to a computer system 10 comprising web servers WS1, WS2 to access information such as over the World Wide Web or Internet. Rather, the present invention can be used in any type of computer system where a load balancing device 14 is used to distribute information or processing loads and requests to two or more paths which can execute the information or requests in parallel.

It is understood that FIGS. 1 and 2 illustrate various objects WS1, AS1, DB1, WS2, AS2 which form part of the computer system 10. However, the actual arrangement of these objects WS1, AS1, DB1, WS2, AS2 within the physical computer system 10 can be determined by a system programmer. In other words, each of the objects WS1, AS1, DB1, WS2, AS2 can be located on an individual host computer, or a combination of the objects WS1, AS1, DB1, WS2, AS2 can be located on only two, or a single host computer, provided the host computer has the capability to execute the corresponding objects WS1, AS1, DB1, WS2, AS2.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure.has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. In a computer system for receiving information from a network, said computer system operable to process said information through at least two paths with at least two layers in one of the paths, a load balancing system for balancing processing of the information on each of the paths of the computer system, said load balancing system comprising:

a load balancing device for routing said information to each of the at least two paths;

health assessing agents for assessing the health of at least two layers on each path and generating layer health signals indicative of the health of each assessed layer;

application information manager for receiving the layer health signals, determining the health of each path based on the health signals, and generating path health signals indicative of the health of each path; and wherein the load balancing device receives the health path signals and routes the information to the path based on the health of the paths.

2. The load balancing system as defined in claim 1 wherein the application information manager comprises a topology of the computer system and determines the health of each path based on the topology of the computer system.

3. The load balancing system as defined in claim 2 wherein the topology is predetermined and inputted into the application information manager.

4. The load balancing system as defined in claim 2 wherein the application information manager independently determines the topology of the computer system.

5. The load balancing system as defined in claim 1 wherein each layer comprises a hardware component and an application component; and wherein the layer health signals generated by the health assessing agents are indicative of the health of the hardware component and the application component of the layer.

6. The load balancing system as defined in claim 5 wherein each layer of the paths comprises a web server, an application server or a database server.

7. The load balancing system as defined in claim 1 wherein the application information manager determines the health of each path pursuant to a predetermined algorithm.

8. The load balancing system as defined in claim 7 wherein the algorithm comprises a weighted sum of the layer health signals indicative of the health of each assessed layer.

9. The load balancing system as defined in claim 7 wherein the algorithm produces binary path health signals indicating that the path is healthy and the load balancing device can route information to the path or indicating that the path is unhealthy and the load balancing device should not route information to the path;

wherein if the health of the path is determined to be above a first threshold value, the algorithm generates a path health signal for the path indicating the path is healthy; and wherein if the health of the path is determined to be below a second threshold value, the algorithm generates a path health signal for the path indicating the path is unhealthy.

10. The load balancing system as defined in claim 9 wherein the first threshold value is greater than the second threshold value.

11. The load balancing system as defined in claim 7 wherein the algorithm permits the path health signals for a corresponding path to be locked such that the path health signal for the corresponding path will not change until the application information manager receives a signal to unlock the path health signal for the corresponding path.

12. The load balancing system as defined in claim 7 wherein the application information manager can add an additional path of the computer system to which the load balancing device can route information if the path health signals are collectively below a predetermined value; and wherein the application information manager can remove a path to which the load balancing device can route information if the path health signals are above the predetermined value.

13. In a computer system for receiving information from a network, said computer system operable to process said information through at least two paths with at least two layers on one of the paths, a load balancing method for balancing processing of the information on each of the paths of the computer system, said load balancing method comprising the steps of:

assessing the health of at least two layers on each path;

generating layer health signals indicative of the health of each assessed layer;

determining the health of each path based on the layer health signals;

generating path health signals indicative of the health of each path; and routing the information to the paths based on the health of the paths.

14. The load balancing method as defined in claim 13 further comprising the steps of:

determining a topology of the computer system; and wherein the step of determining the health of each path is based on the layer health signals and the topology of the computer system.

15. The load balancing method as defined in claim 14 wherein the topology of the computer system is independently determined by an application information manager.

16. The load balancing method as defined in claim 13 wherein the step of assessing the health of each assessed layer comprises the steps of assessing the health of a hardware component and an application component of each assessed layer.

17. The load balancing method as defined in claim 13 wherein the step of determining the health of each path is determined according to a predetermined algorithm.

18. The load balancing method as defined in claim 17 wherein the algorithm comprises a weighted sum of the layer health signals indicative of the health of the assessed layers.

19. The load balancing method as defined in claim 17 wherein the algorithm produces binary path health signals indicating that the path is healthy and information can be routed to the path or indicating that the path is unhealthy and information should not be routed to the path;

wherein if the health of the path is determined to be above a first threshold value, the algorithm generates a path health signal for the path indicating the path is healthy; and wherein if the health of the path is determined to be below a second threshold value, the algorithm generates a path health signal for the path indicating the path is unhealthy.

20. The load balancing method as defined in claim 13 further comprising the steps of:
- adding an additional path of the computer system to which information can be routed if the path health signals are collectively below a predetermined value; and
- removing a path to which information can be routed if the path health signals are collectively above a predetermined value.

21. In a computer system for receiving information from a network, said computer system operable to process said information through at least two paths with at least two layers in one of the paths, a load balancing system for balancing processing of the information on each of the paths of the computer system, said load balancing system comprising:
- a load balancing device for routing said information to each of the at least two paths;
- health assessing agents for assessing the health of at least two layers on each path and generating layer health signals indicative of the health of each assessed layer, the health of the at least two layers being indicative of the status of the hardware and software being executed by each of the at least two layers based on an agent framework library which produces a numerical value corresponding to conditions of the at least two layers including response time to a request, receipt of an error, the number of connections, the number of threads and the number of database connections;
- application information manager for receiving the layer health signals, determining the health of each path based on the health signals, and generating path health signals indicative of the health of each path; and
- wherein the load balancing device receives the health path signals and routes the information to the path based on the health of the paths.

* * * * *